United States Patent [19]

Berg et al.

[11] 4,230,443
[45] Oct. 28, 1980

[54] VAPORIZING BURNER

[75] Inventors: Hermann O. Berg, Florstadt; Peter Gulden, Erlangen; Hana Kostka, Nuremberg; Alfred Michel, Erlangen, all of Fed. Rep. of Germany

[73] Assignee: Siemens Aktiengesellschaft, Berlin and Munich, Fed. Rep. of Germany

[21] Appl. No.: 16,329

[22] Filed: Feb. 27, 1979

[30] Foreign Application Priority Data

Mar. 15, 1978 [DE] Fed. Rep. of Germany ....... 2811273

[51] Int. Cl.³ ...................... F23D 13/14; F23D 13/40
[52] U.S. Cl. ......................................... 431/328; 431/7; 431/115
[58] Field of Search .................... 431/328, 7, 147, 115

[56] References Cited

U.S. PATENT DOCUMENTS

| 3,421,859 | 1/1969 | Kruggel | 431/328 |
| 3,787,168 | 1/1974 | Koppang et al. | 431/115 |
| 3,922,136 | 11/1975 | Koch | 431/328 |
| 3,940,923 | 3/1976 | Pfefferle | 431/7 |
| 4,045,159 | 8/1977 | Nishi et al. | 431/328 |
| 4,089,303 | 5/1978 | Brulfert | 431/328 |
| 4,168,946 | 9/1979 | Rice | 431/7 |

FOREIGN PATENT DOCUMENTS

| 2322181 | 11/1973 | Fed. Rep. of Germany | 431/328 |
| 2331570 | 12/1973 | Fed. Rep. of Germany | 431/328 |
| 2414607 | 10/1974 | Fed. Rep. of Germany | 431/328 |

Primary Examiner—George E. Lowrance
Attorney, Agent, or Firm—Scully, Scott, Murphy & Presser

[57] ABSTRACT

A vaporizing burner which includes a multi-portioned burner housing. The housing encompasses an inlet chamber, ahead of which there is located an antechamber which transitions into an annular passageway wherein heating oil is vaporized. The heating oil is admixed with preheated primary air and converted into a fuel gas in a catalyzer arrangement. Thereafter, the fuel gas is admixed with secondary air in a mixing chamber, ignited in an ignition chamber and conveyed into a further chamber. The last-mentioned chamber is closed off by a burner plate which is heated by the fuel gas and which transmits the usable heat to a suitable heat exchanger.

12 Claims, 1 Drawing Figure

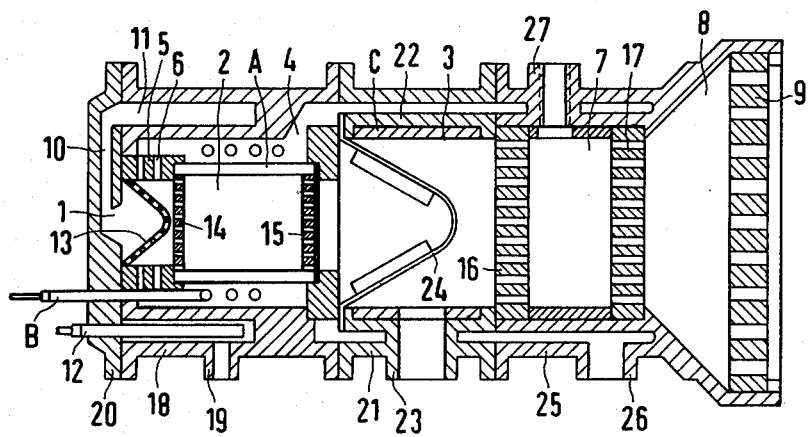

VAPORIZING BURNER

BACKGROUND OF THE INVENTION

1. Field of the Invention

The present invention relates to a vaporizing burner which includes an inlet for admixing an at least partially vaporized, liquid fuel with primary air; and with a catalyzer arrangement communicating with the inlet chamber for the conversion of the vapor-air mixture into a fuel gas; the vaporizing burner further including a mixing chamber adjoining the catalyzer arrangement for the admixing of the fuel gas with secondary air. In the vaporizing burner, an annular chamber concentrically encompasses the inlet chamber, the catalyst arrangement and the mixing chamber, and is separated from the inlet chamber through an annular wall; the burner also including a conically widening chamber and an apertured burner plate of porous material which closes off the widening chamber into which the fuel gas-air mixture is adapted to be introduced from the mixing chamber.

2. Discussion of the Prior Art

A vaporizing burner of the above-mentioned general type is already presently known from German Published Patent Specification No. 2,260,586.

SUMMARY OF THE INVENTION

Accordingly, it is an object of the present invention to so design a vaporizing burner of the type set forth hereinabove, as to enable the burner to be operable with fuels which are liquid under normal conditions in a continuously adjustable, particularly soot- and deleterious material-free and, in a particularly advantageous manner, to be able to utilize the vaporizing burner as a heat generator, for example, as a heat source for heating plants.

The foregoing object is inventively attained by a novel design or arrangement for the vaporizing burner which includes an antechamber arranged ahead of the inlet chamber, wherein the antechamber transitions into an annular passageway which entirely surrounds the inlet chamber and encompasses the annular chamber as well as the catalyzer arrangement for at least a portion of their lengths. The annular passageway is provided with a heat source for the vaporization of the fuel, and the annular chamber includes a heat source for the preheating of the primary air during the starting-up sequence and for support during load changes; the annular wall being equipped with radial passageways which connect the annular chamber with the inlet chamber; homogenizing devices being located in, respectively, the inlet chamber and the mixing chamber; and an ignition chamber being arranged intermediate the conically widening chamber and the mixing chamber and in which the ignition chamber is separated from the mixing chamber in a non-backfiring manner.

BRIEF DESCRIPTION OF THE DRAWING

Reference may now be had to the following detailed description of an exemplary embodiment of a vaporizing burner constructed pursuant to the present invention, taken in conjunction with the single FIGURE of the accompanying drawing, illustrating the burner in a longitudinal sectional view.

DETAILED DESCRIPTION

Referring now in detail to the single FIGURE of the drawing, an inlet chamber, identified by reference numeral 1, has at least a partially vaporized fuel which is liquid under normal conditions admixed with preheated primary air at an air ratio of between 0.05 and 0.5, preferably $\lambda = 0.1 - 0.2$.

Connected to the inlet chamber 1 is a catalyzer arrangement 2 wherein the homogeneous vapor-air mixture which is formed in prechamber 1 is converted into a fuel gas through partial oxidation on a catalyzer. The catalyzer (not shown) is contained in a catalytically-inactive container A which is constituted of a ceramic material, and in whose end walls 14 and 15 there are provided a large number of through-apertures for the passage therethrough of the employed materials and of the reaction products. The catalyst container is so arranged in a cartridge-like manner as to be easily exchangeable.

Adjoining the catalyzer arrangement 2 is a mixing chamber 3 in which secondary air is admixed with the fuel gas exiting from the catalyzer arrangement 2.

The inlet chamber 1, the catalyzer arrangement 2, and the mixing chamber 3 are concentrically encompassed by an annular chamber 4 which is separated from the inlet chamber 1 through the intermediary of a catalytically-inactive annular wall 5. The annular wall 5 is provided with radial passageways 6 through which primary air, which is preheated from a portion of the reaction heat of the catalyzer arrangement 2 and a portion of the combustion heat released in an ignition chamber, can flow from the annular chamber 4 into the inlet chamber 1.

An ignition or combustion chamber 7 is connected to the mixing chamber 3, and a conically widening or expanding chamber 8 is connected to the ignition chamber 7, the chamber 8 being closed off by an apertured burner plate 9 which is constituted of a porous material.

Arranged ahead of the inlet chamber 1 is an antechamber 10 which transitions into an annular passageway 11. The annular passageway 11 completely surrounds the inlet chamber 1, and encompasses the annular chamber 4 as well as the catalyzer arrangement 2 for at least a portion of their lengths. The annular passageway 11 and the annular chamber 4 each, respectively, contain controllable heat sources 12 and B for, respectively, the vaporizing of the fuel and for the preheating of the primary air during the starting-up process and during load changes. In the illustrated example, the heat sources 12 and B are each electrical heating coil elements. The heating coil element 12 is linear and extends in the longitudinal direction of the annular passageway 11. The heating coil member 12 is located in the annular chamber 4 with one coiled portion thereof. Its linear extension is conducted out of the burner in parallel with the heating coil member 12.

The annular chamber 4 surrounds not only the inlet chamber 1, the catalyzer arrangement 2, and the mixing chamber 3, but also the ignition chamber 7, as well as also, at least partly, the conically widening chamber 8.

In order to effectuate the homogeneous intermixing of the vaporized primary fuel and the preheated primary air, a catalytically-inactive mixing or swirling diaphragm 13 is arranged in the inlet chamber 1 and can be shaped, for example, either conically or as a disc.

Located intermediate the mixing chamber 3 and the ignition chamber 7 is an apertured disc 16, whereas the ignition chamber 7 is separated from the conically widening chamber 8 through the interposition of an apertured wall 17.

The apertured disc 16 is, among other requirements, so constructed as to separate the ignition chamber 7 from the mixing chamber 3 without any backfiring.

All of the burner components 1 through 17 are arranged within a multi-positioned housing.

A first portion 18 of the housing contains the inlet chamber 1, the catalyzer arrangement 2, a first section of the annular chamber 4, the annular wall 5, the antechamber 10, the annular passageway 11, the heat sources 12 and B, the swirling diaphragm 13, and the catalyst cartridge A with the end walls 14 and 15.

The first portion 18 of the housing includes a radial connector member 19 for the supply of fuel to the annular passageway 11. In the illustrated embodiment, the outlet of the connector member 19 into the annular passageway 11 is overlapped by the heat source 12.

The free side of the first portion 18 of the housing is closed off by a closure 20 which is passed through by the heat sources 12 and B, in effect which supports the heating coil elements.

A central or intermediate portion 21 of the housing incorporates a further section of the annular chamber 4, and a heat-conductive wall 22 which separates the mixing chamber 3 from the annular chamber 4. Furthermore, the central portion 21 of the housing is provided with a radial connector member 23 for the supply of secondary air to the mixing chamber 3. The central portion 21 of the housing also includes a mixing or swirling arrangement 24 constituted of a catalytically-inactive material which is located in the mixing chamber 3 and which can be equipped with a cladding C of a catalytically-inactive material.

An end portion 25 of the housing contains the ignition or combustion chamber 7, the apertured burner plate 9, the apertured disc 16 and the apertured wall 17, as well as an end section of the annular chamber 4. Furthermore, the end portion 25 of the housing is provided with a radial connector member 26 for the supply of primary air to the annular chamber 4, as well as a further connector means 27 for an ignitor device (not shown).

The components 18, 21 and 25 of the housing are provided with suitable flanges (not shown) to facilitate their interconnection.

In the illustrated embodiment of the invention, the annular chamber 4 is smaller in diameter within the first portion 18 of the housing than in the remaining housing portions 21 and 25.

The operation of the inventive vaporizing burner is as follows:

The catalyst in the catalyzer cartridge 2 is preheated to the reaction-initiating temperature by means of heat conduction with the aid of the adjustable heat source B and the simultaneously preheated quantity-regulated primary air.

The liquid fuel is thus conducted through the inlet connector member 19 into the annular passageway 11 in a quantity-controlled manner and therein vaporized, initially with the assistance of the heat source 12, subsequently with the utilization of a portion of the reaction heat of the catalyzer arrangement 2. After reaching of the reactor operating temperature, the heat sources 12 and B can be either partially or completely shut off.

The vaporized fuel passes through the antechamber 10 into the inlet chamber 1 and is therein homogeneously admixed with preheated primary air at an air ratio of $0.05 \leq \lambda \leq 0.5$, preferably at $\lambda = 0.1 - 0.2$ under the auxiliary effect of the mixing or swirling diaphragm 13. The preheated temperature of the air is thereby so regulated that the fuel vapor-primary air mixture will not spontaneously ignite.

The primary air is conducted through the inlet connector member 26, the annular chamber 4, and the radial passageways 6 into the inlet chamber 1. Along its path the primary air absorbs heat, primarily through contact and the conduction, from the ignition or combustion chamber 7, the mixing chamber 3, the catalyzer arrangement 2 and the heat source B. The primary air enters into the inlet chamber 1 downstream of the catalytically-inactive mixing diaphragm 13 and mixes therein with the vaporized fuel.

The vapor-air mixture flows into the catalyst arrangement 2 and is therein converted into a fuel gas.

The fuel gas which exits from the catalyzer arrangement 2 is admixed in the mixing chamber 3 almost stoichiometrically with secondary air with the assistance of the mixing diaphragm 24, for example, at $\lambda = 1.05$. The secondary air is conducted into mixing chamber 3 through the radial inlet connector members 23 and can be preheated.

The fuel gas-air mixture flows from the mixing chamber 3 into the ignition or combustion chamber 7 and is ignited therein.

The ignited mixture exits soot-free and blue-burning from the apertured wall 17 into the conically widening chamber 8 and heats the burner plate 9 to a temperature of about 1200° C.

The removable heat can be used for heating purposes through the intermediary of a suitable heat exchanger which, as a result of the high convection components and the freedom of the exhaust gases from soot, can be maintained relatively small in size.

Through the homogeneous admixing of the produced fuel gas with an almost stoichiometric air quantity, in comparison with an atomizing burner, the mixture burns soot-free with an extremely low CO and HC content. For a sulfur-containing primary fuel, such as light heating oil, due to a lack of excess air there is essentially produced the harmless $SO_2$ instead of the corrosive $SO_3$. The intended easy and continuous adjustability over a wide range is achieved through the overall arrangement of the inventive vaporizing burner.

What is claimed is:

1. In a vaporizing burner, including an inlet chamber for admixing an at least partially vaporized liquid fuel with primary air; catalyzer means communicating with said inlet chamber for converting said vapor-air mixture into a fuel gas; a mixing chamber adjoining said catalyzer means for admixing said fuel gas with secondary air; and annular chamber concentrically encompassing said inlet chamber, said catalyzer means and said mixing chamber, including an annular wall separating said inlet chamber from said annular chamber; a conically widening chamber for receiving the fuel gas-air mixture from said mixing chamber; and an apertured burner plate of a porous material closing off said widening chamber, the improvement comprising; an antechamber arranged ahead of said inlet chamber, an annular passageway completely surrounding said inlet chamber and encompassing said annular chamber and said catalyzer means for at least a portion of their lengths, said antechamber including a transition into said annular passageway; a first heat source in said annular passageway for the vaporization of said fuel; a second heat source in said annular chamber for preheating of the primary air during burner start-up and for support during load changes, radial passageways in said annular wall for communicating said annular chamber with said inlet chamber; first and second homogenizing means being arranged in, respectively, said inlet chamber and in said mixing chamber; and an ignition chamber being positioned intermediate said conically widening chamber and said mixing chamber, said ignition chamber being separated from said mixing chamber so as to prevent backfiring of the ignited fuel gas.

2. Vaporizing burner as claimed in claim 1, said first homogenizing means in said inlet chamber comprising a swirling diaphragm; said catalyzer means including a catalytically-inactive container having apertured end walls; said second homogenizing means in said mixing chamber comprising a swirling diaphragm; an apertured disc being arranged intermediate said mixing chamber and said ignition chamber; and an apertured wall separating said ignition chamber from said conically widening chamber.

3. Vaporizing burner as claimed in claim 2, said swirling diaphragms being conically-shaped.

4. Vaporizing burner as claimed in claim 2, said swirling diaphragms being disc-shaped.

5. Vaporizing burner as claimed in claim 1, comprising a multi-portioned housing encompassing said burner components; a first housing portion including said antechamber, said inlet chamber, said first homogenizing means, said annular passageway, a section of said annular chamber and said catalyzer means; an intermediate housing portion including said mixing chamber, said second homogenizing means, a further section of said annular chamber and a heat-conductive wall; an end portion of said housing encompassing said ignition chamber, said conically widening chamber including said burner plate and an end section of said annular chamber; and flanges on said housing portions for interconnecting adjacent of said housing portions.

6. Vaporizing burner as claimed in claim 5, said first housing portion comprising a radial connecting member for the inlet of fuel into said annular passageway.

7. Vaporizing burner as claimed in claim 6, said first heat source comprising an electrical heating coil element extending in the longitudinal direction of said annular passageway and traversing the inlet opening of said radial connecting member.

8. Vaporizing burner as claimed in claim 7, said second heat source comprising a circularly-coiled electrical heating coil element.

9. Vaporizing burner as claimed in claim 5, said intermediate housing portion comprising radial connecting means for the inlet of secondary air into said mixing chamber.

10. Vaporizing burner as claimed in claim 5, said end housing portion comprising a first radial inlet connecting member for the inlet of primary air into said annular chamber, and a second connecting member for an ignition arrangement.

11. Vaporizing burner as claimed in claim 5, comprising closure means for closing the free end of said first housing portion, said first and second heating sources extending through said closure means.

12. Vaporizing burner as claimed in claim 5, said annular chamber having a smaller diameter in the first portion of said housing than in the intermediate and end portions of said housing.

* * * * *